L. F. NOE.
Culinary Steamer.
No. 38,239. Patented April 21, 1863.
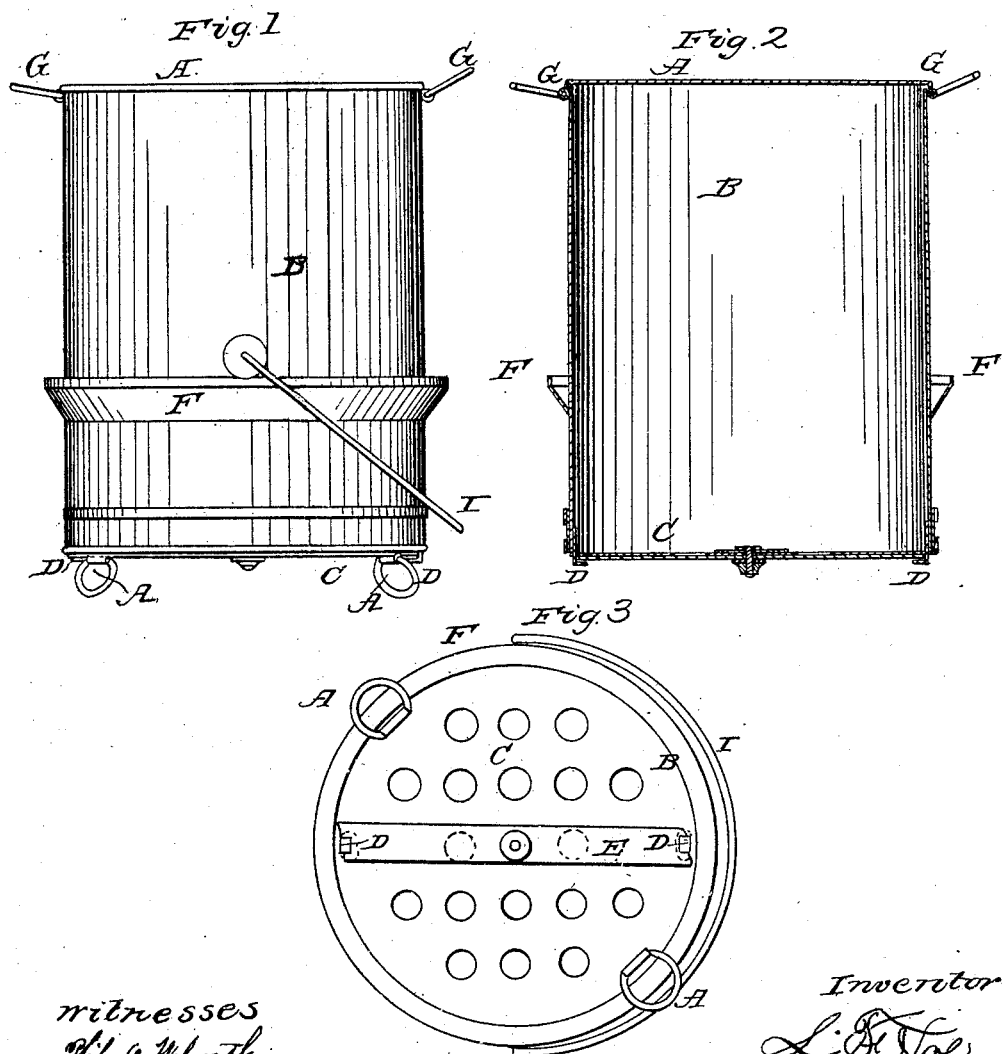

UNITED STATES PATENT OFFICE.

LEWIS F. NOÉ, OF NEW YORK, N. Y.

IMPROVEMENT IN CULINARY STEAMERS.

Specification forming part of Letters Patent No. 38,239, dated April 21, 1863.

*To all whom it may concern:*

Be it known that I, LEWIS F. NOÉ, of the city, county, and State of New York, have invented a new and useful improvement in culinary steamers or vessels for steaming and cooking food; and I do hereby declare that the following is a full, clear, and exact description thereof, reference being had to the accompanying drawings, making a part of this specification, in which—

Figure 1 is a side elevation of the said steamer. Fig. 2 is a vertical section through the center thereof. Fig. 3 is an under side view or plan inverted.

My said invention relates to the manner of connecting and securing the parts, and supporting the steamer upon the vessel upon which it is to be used, by which the said steamer is made more efficient and less liable to allow the escape of the steam used for the purpose of cooking, into the room, as hereinafter more fully set forth.

A is the top of the steamer; B, the sides; C, the perforated bottom upon which the food is supported while being steamed or cooked. Instead of a cover being attached at the top and made removable to allow the food to be removed at that point, the top is closed, and the perforated bottom has a narrow flange attached to it which slips onto or into the main body of the steamer. It may either fit inside or outside of the sides B, but I prefer the outside for the convenience of fastening it to the said sides. For the purpose of securing the bottom C to the sides B, I extend two hooks or catches, D D, from the sides B of the vessel, which catches extend down through holes in the perforated bottom C, and are caught by the arm or catch E, which is pivoted to the center of the said perforated bottom. This forms a cheap and secure fastening, but other modes of fastening may be used, if desired. Some distance from the bottom (which distance may be varied) I attach to the sides D a flange, F, which projects out obliquely from the sides and is intended to fit the top of a kettle or pot upon which the steamer may be used. This may be placed nearly down to the bottom of the vessel, if desired, or it may be placed farther up than represented in the drawings, if for the purpose for which it is to be used it may be considered desirable, the object of the improvement being in either case accomplished by placing this flange above the bottom C, or its junction with the sides, so as to prevent the escape of steam from the steamer.

G G are ears attached to the top of the vessel for the purpose of handling it, and H H are ears attached to the perforated bottom for a similar purpose. I is a bail attached to the sides of the vessel near the middle, also for the purpose of handling the vessel; but this may be dispensed with, perhaps without serious detriment.

Having thus fully described my invention, I claim—

A culinary steamer, combining the attachment or junction of the top and bottom portions below the line of support upon the vessel on which it is to be used, with the projecting rim F, or its equivalent, substantially as and for the purpose set forth.

LEWIS F. NOÉ.

Witnesses:
L. A. ROBERTS,
THOS. P. HOW.